United States Patent [19]

Lambert

[11] Patent Number: 4,516,393
[45] Date of Patent: May 14, 1985

[54] WHEELED PUSH RAKE

[76] Inventor: Phillip E. Lambert, Rte. 2, Zimmerman, Minn. 55398

[21] Appl. No.: 529,344

[22] Filed: Sep. 6, 1983

[51] Int. Cl.³ .............................................. A01D 7/00
[52] U.S. Cl. ................................ 56/400.2; 56/400.17; 56/400.19
[58] Field of Search .......... 56/16.7, 396, 397, 400.01, 56/400.14, 400.16, 400.17, 400.18, 400.19, 400.2

[56] References Cited

U.S. PATENT DOCUMENTS

| | | | |
|---|---|---|---|
| 432,168 | 7/1890 | O'Neill et al. | 56/396 |
| 788,667 | 5/1905 | McCann | 56/400.19 |
| 987,008 | 3/1911 | McKibbin | 56/400.19 |
| 1,020,228 | 3/1912 | Suhm | 56/400.19 |
| 1,763,473 | 6/1930 | Mehl | 56/400.2 |
| 4,009,560 | 3/1977 | Wells | 56/400.14 |
| 4,299,079 | 11/1981 | Lambert | 56/16.7 |

Primary Examiner—Gene Mancene
Assistant Examiner—David I. Tarnoff
Attorney, Agent, or Firm—Peterson, Wicks, Nemer & Kamrath

[57] ABSTRACT

The push rake includes two pivotally connected frame units. A plurality of broom rakes are mounted on the first frame unit. A spring mechanism becomes loaded as the rake is manually pushed across the ground in forming a windrow, the stored spring energy being automatically released when the user stops pushing.

16 Claims, 9 Drawing Figures

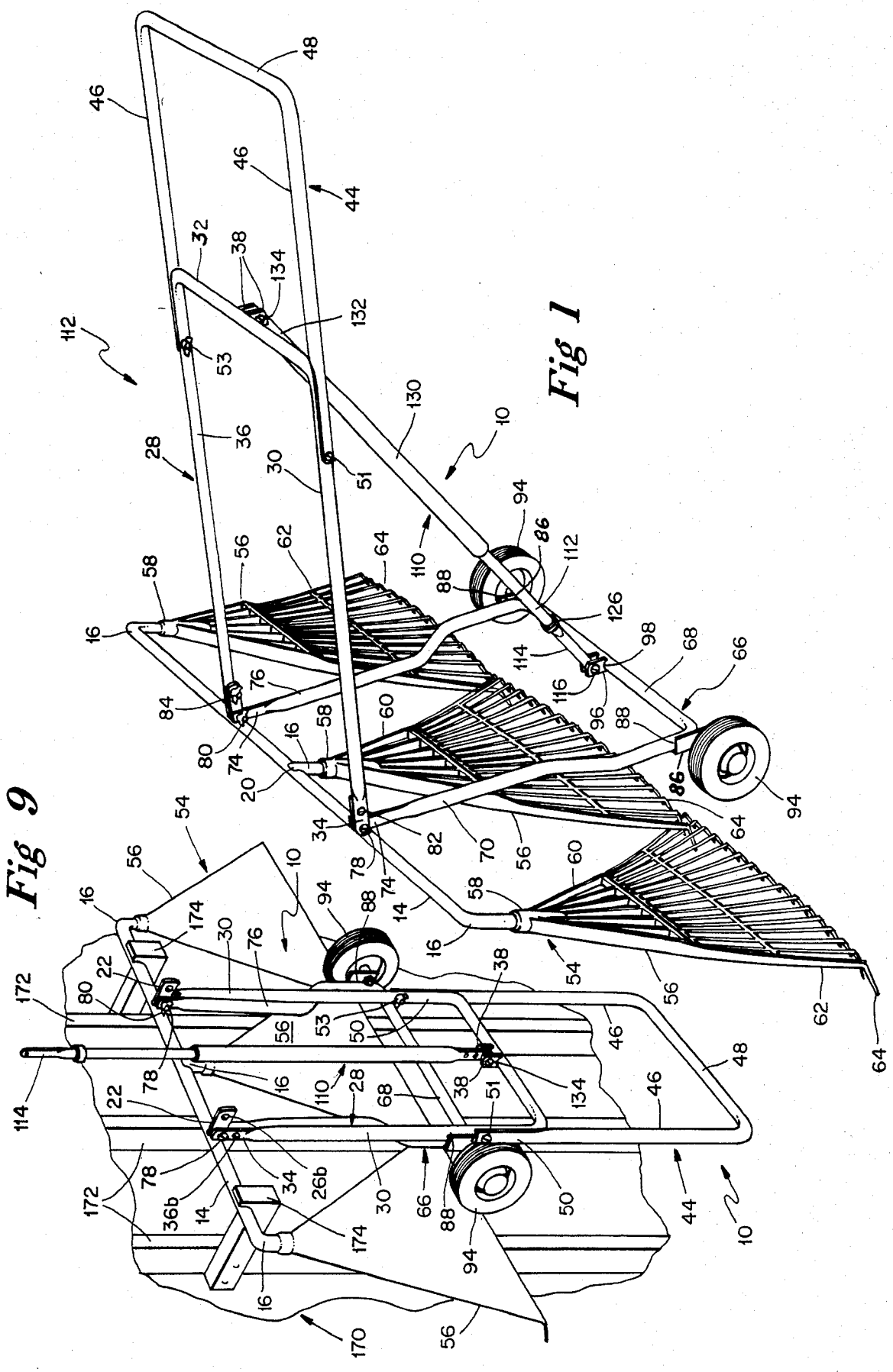

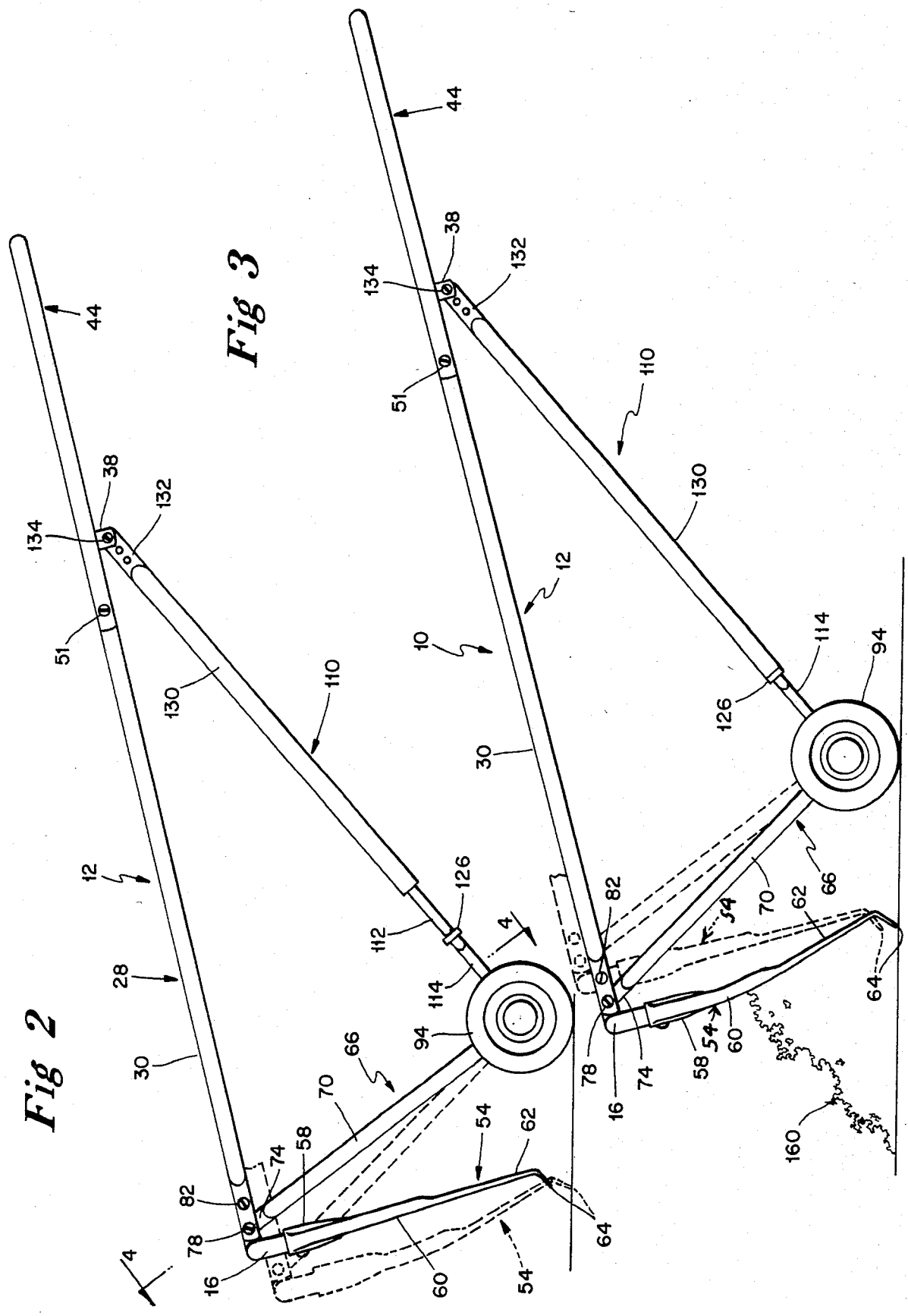

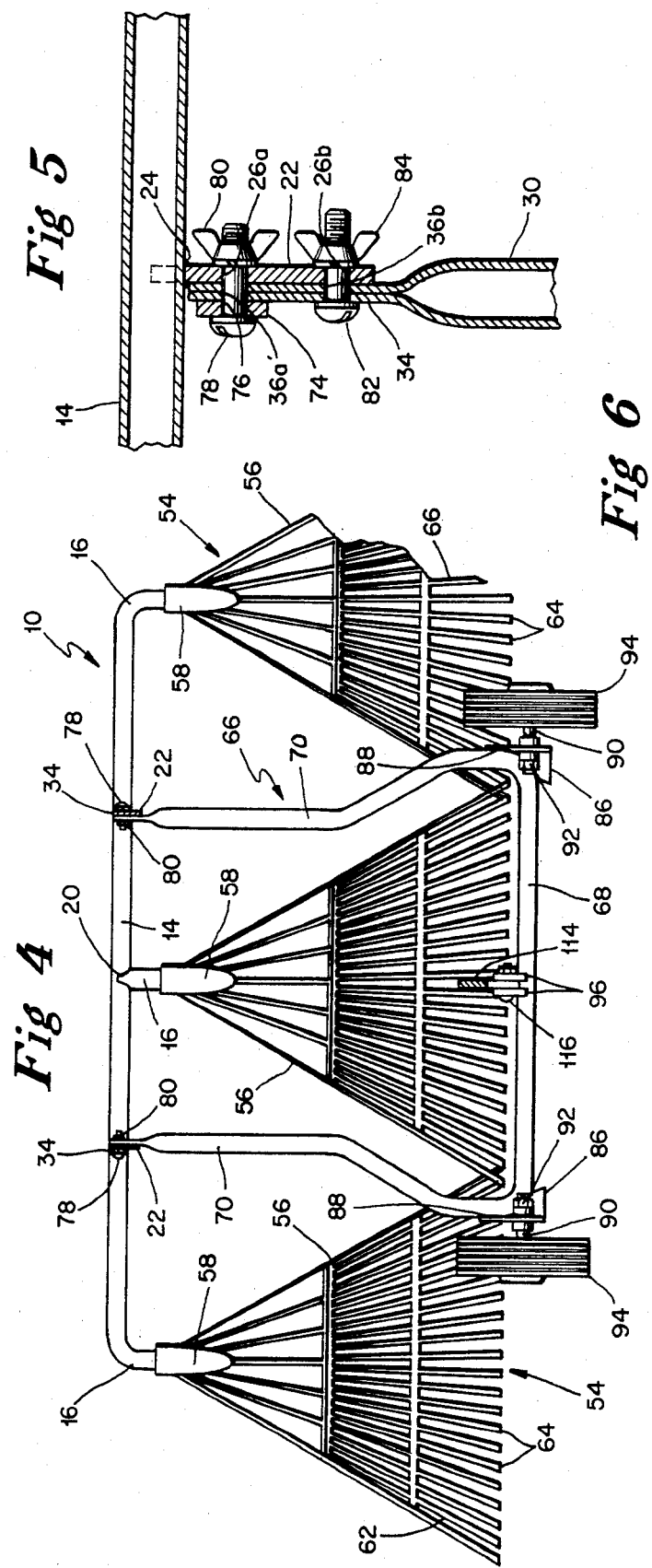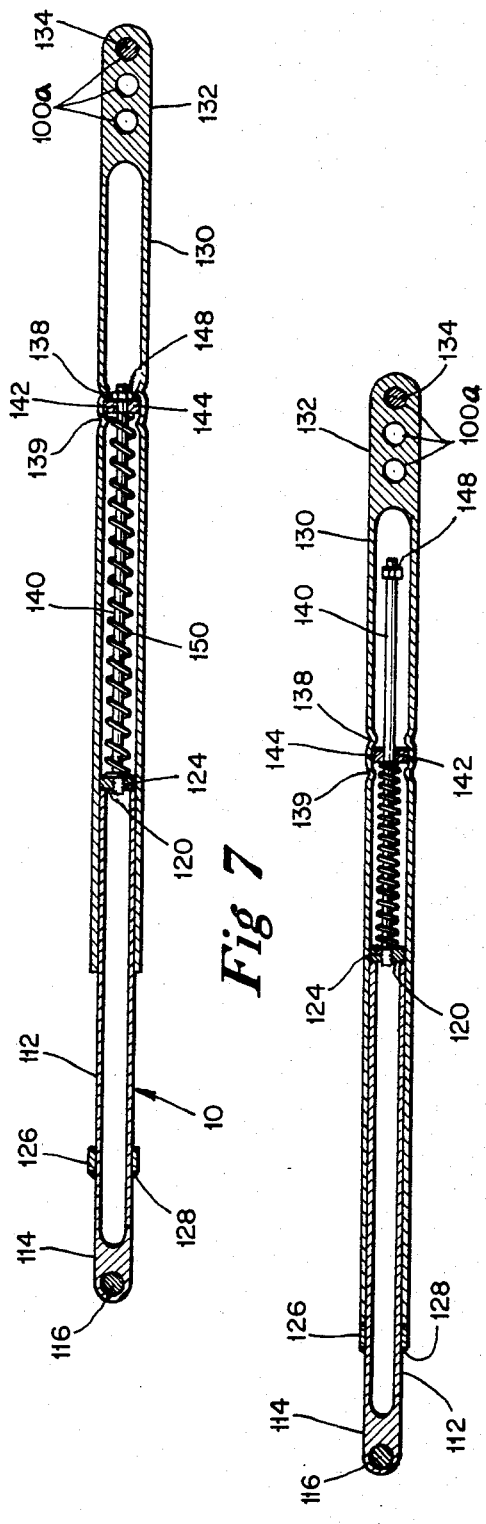

WHEELED PUSH RAKE

BACKGROUND OF THE INVENTION

This invention relates generally to a push rake, and pertains more particularly to a wheeled push rake utilizing a spring mechanism which enables the one or more rake heads to yield as the rake is pushed across the ground.

DESCRIPTION OF THE PRIOR ART

Although I have not actually seen a wheeled push rake, wheeled push rakes are not completely new, for one such rake is disclosed in U.S. Pat. No. 788,667 issued on May 2, 1904 to Marion W. McCann titled "WHEELED HAND RAKE". However, the rake disclosed in said patent does not employ any spring mechanism that would permit the rake head to resiliently yield during a raking operation. Accordingly, the patented rake requires attentive manipulation when raking leaves, loose grass and other common lawn debris.

SUMMARY OF THE INVENTION

Accordingly, an object of my invention is to provide a wheeled hand rake that employs a spring mechanism which enables the one or more rake heads to yieldably tilt so that the tines scrape across the ground in an automatically controlled manner. In this regard, an aim of the invention is to spring load the broom-type rake heads so that they not only yield to the desired degree during a raking operation but spring back to their initial position whenever the user stops pushing the rake. In this way, a kicking action is derived which facilitates the windrowing of leaves, grass and the like.

Another object of the invention is to provide a wheeled rake that can be used in a variety of ways including a broom-like sweeping manner which involves a sequence of jab-like short strokes. Whether pushed completely from one side of the lawn to the other or used in the alluded to broom-like sweeping fashion, the one or more rake heads automatically elevate themselves at the end of the stroke so that the rake can be moved rearwardly without dragging the tines of the rake heads across the ground during such reverse movement.

Another object of the invention is to provide a rake that will be very lightweight so that it can be handled in different ways without difficulty and also by persons of various ages.

Further, an object is to provide a rake that will permit rake heads to be readily changed whenever circumstances so dictate. In this regard, an aim of the invention is to provide a rake that will make use of readily procurable broom-type rake heads, provision being made so that replacement can be easily accomplished.

Also, the invention has for an object the provision of a rake that will be relatively inexpensive to manufacture, thereby encouraging its widespread use.

Yet another object is to provide a rake that will be rugged and long lasting.

Still further, an object of the invention is to provide a rake of the alluded to type that can be easily collapsed for storage.

Briefly, my invention comprises a first frame unit which includes an upper cross bar and rearwardly extending handle means. Also included is a second or U-shaped frame unit which comprises a lower cross bar and upwardly extending arms at each end of its cross bar. The first frame unit further includes a number of downwardly projecting pegs on its cross bar that are received in the sockets or hosels of a corresponding number of rake heads that are preferably of the broom variety. The second or U-shaped frame unit is provided with wheels, there being one wheel at the lower end of each arm. The two frame units are pivotally connected together at the upper ends of the arms so that the tines belonging to the rake heads are engageable with the ground to be raked. A spring mechanism is comprised of a pair of telescoping tubular members and a coil spring, the spring mechanism being pivotally connected at one end to the bight of the U-shaped handle of the first frame unit and the other end of the spring mechanism is pivotally connected to the cross bar of the second frame unit. In this way, when pushing the rake across the ground to be raked, the spring mechanism permits the rake heads to yield, the spring mechanism resiliently biasing the rake heads in a direction to return the rake heads to their initial position when the user stops pushing the rake. Whenever the user stops pushing the rake, the tines of the rake heads are automatically raised by spring action to facilitate pulling the rake rearwardly. Still further, a resilient kick can be imparted to the rake heads at the end of each pushing stroke to improve windrowing.

BRIEF DESCRIPTION OF THE DRAWINGS

FIG. 1 is a perspective view of a wheeled push rake exemplifying my invention, the view depicting the rake just prior to inaugurating a raking operation;

FIG. 2 is a side elevational view of my push rake, the solid line position corresponding to the initial raised condition pictured in FIG. 1 and the dotted line position illustrating the condition that results during a raking operation;

FIG. 3 is a side elevational view, the solid line position in this instance corresponding to the dotted line position of FIG. 2 and the dotted line position illustrating the rake at the end of a raking stroke;

FIG. 4 is a transverse elevational view taken in the direction of line 4—4 of FIG. 2;

FIG. 5 is an enlarged sectional detail taken in the direction of line 5—5 of FIG. 2;

FIG. 6 is a longitudinal sectional view of the spring mechanism, the spring mechanism in this view assuming an unloaded condition that corresponds to the solid line position of the rake means in FIG. 2 and the dotted line position thereof in FIG. 3;

FIG. 7 is a sectional view of the spring mechanism corresponding to FIG. 6, the spring mechanism being in the loaded condition corresponding to the dotted line position of the rake means in FIG. 2 and the solid line position of the rake means shown in FIG. 3;

FIG. 9 is a perspective view of my rake when collapsed and hung for storage.

DESSCRIPTION OF THE PREFERRED EMBODIMENT

Figure 8:
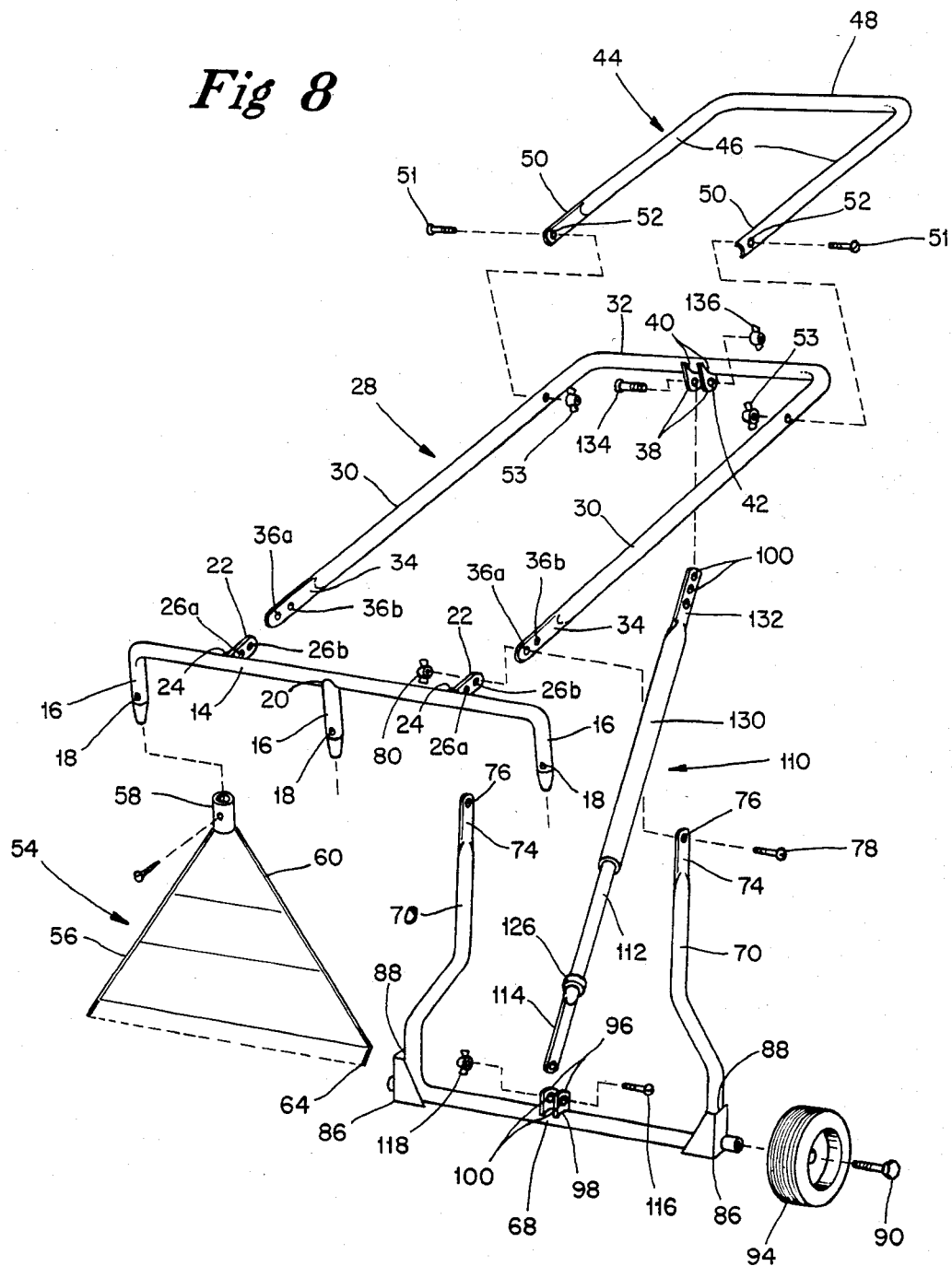
FIG. 8 is an exploded perspective view of my rake for the purpose of better exemplifying the parts thereof.

Referring now in detail to the drawings, a wheeled push rake exemplifying my invention has been denoted generally by the reference numeral 10.

The rake 10 comprises a first frame unit 12 which includes a cross bar 14 provided with a trio of downwardly projecting tubular pegs 16, each having a hole 18 extending therethrough. Inasmuch as tubular metal stock is contemplated, the two outer pegs 16 can simply be bent into position, it being planned that the tube constituting the cross bar 14 be sufficiently long initially to permit this; the central or middle peg 16, however, is welded to the cross bar 14 at 20. The cross bar 14 is additionally provided with a pair of ears 22, each being welded to the cross bar 14 at 24 and each having two holes 26a and 26b extending therethrough.

Additionally, the frame unit 12 includes a rearwardly extending U-shaped tubular member 28 having parallel legs 30 and a bight 32. The legs 30 have flattened end portions 34 formed with a pair of holes 36a and 36b registrable with the holes 26a and 26b, respectively. A clevis of pairs of ears 38 project downwardly from the bight 32, each ear 38 being welded to the bight 32 at 40 and having a hole 42 therein.

In the illustrated instance a U-shaped handle 44 is employed, the handle 44 having parallel legs 46 and a bight 48 which the operator graps during use. The legs 46 have integral end portions 50 possessing an arcuate cross section, each end portion 50 having a hole 52 therein. A bolt 51 extends through each hole 52, a wing nut 53 holding the bolt 51 in place in each instance.

It will be observed that the tubular pegs 16 reside in a generally vertical plane that includes the cross bar 14, whereas the handle 44 resides in a generally horizontal plane that also includes the cross bar 14.

The rake 10 further includes rake means indicated generally by the reference numeral 54. In the illustrated instance there are three broom rakes 56, each having a socket or hosel 58. Additionally, the broom rake 56 includes a web or flat portion 60 having integral tines 62 projecting therefrom which terminate in forwardly curving lower ends of tips labeled 64. It will be perceived that each broom rake 56 is mounted to the cross bar 14 through the agency of the three tubular pegs 16. While three tubular pegs 16 and three broom rakes 56 have been depicted, it will be understood that the rake means 54 can include any preferred number of broom rakes 56 and actually can constitute other forms of rake constructions. As the description progresses, it will be seen that provision is made for resiliently biasing the rake means 54 in a particular direction.

There is a second frame unit indicated generally by the reference numeral 66. The frame unit 66, which is generally U-shaped, includes a cross bar 68 similar to the cross bar 14 but at a considerably lower elevation, as can be readily understood from the drawings. The frame unit 66 further comprises a pair of laterally spaced parallel arms 70 (but not straight in that they are bent with offset portions as can be perceived from FIGS. 1, 4 and 8), the lower ends of the arms 70 being integral with the ends of the cross bar 68. In practice, the cross bar 68 and the arms 70 are formed from a single tubular member, the arms 70 being bent into a generally perpendicular relationship with the cross bar 68, thereby imparting the previously mentioned U-shaped appearance to the second frame unit 66. The upper end portions 74 of the arms 70 are flattened, each end having a hole 76 extending therethrough.

Bolts or screws 78 are utilized to pivotally connect the two frame units 12 and 66 together, there being one bolt 78 at one side of the rake 10 and a second bolt 78 at the other side. The bolts 78 extend through the holes 36a in the end portions 34, the holes 26a in the ears 22 and the holes 76 in the ends 74 of the arms 70. Each bolt 78 has a wing nut 80 threadedly mounted thereon.

By means of additional bolts 82 and wing nuts 84, which extend through the holes 26b in the ears 22 and the holes 36b in the end portions 34 of the legs 30, the U-shaped member 28 is prevented, during use, from pivoting relative the cross bar 14.

It will be appreciated that the first and second frame units 12, 66 are pivotally connected to each other by reason of the bolts 78 as described above.

As best seen from FIG. 4, the arms 70 of the second frame unit 66 have brackets 86 welded thereto, the welds being indicated by the reference numeral 88. A bolt 90 issues outwardly from the lower end of each bracket 86, having a nut 92 (FIG. 4) thereon that holds a wheel 94 captive, the wheels 94 in this way being journaled for rotation on the bolts 90. State somewhat differently, the nuts 92 hold the wheels 94 in place at the lower ends of the arms 70 to assure that the wheels 94 remain rotatably mounted to the lower end of the frame unit 66.

Centrally located on the cross bar 68 of the frame unit 66 is a clevis of pair of ears 96, the ears 96 being welded to the cross bar 68 at 98. The ears 96 have holes 100 therein.

Playing an important role in the practicing of my invention is a spring mechanism denoted in its entirety by the reference numeral 110. The spring mechanism 110 comprises a tubular member 112 having a flattened lower end portion 114 which is pivotally connected between the ears 96 by means of a bolt 116, the bolt 116 passing through the holes 100 in the ears 96 and having a wing nut 118 attached thereof. An annular plug 120 is welded at 122 to the upper end of the tubular member 112, the plug 120 having a central threaded hole 124 therein. The tubular member 112 has a stop ring 126 thereon, the stop ring 126 being welded to the exterior of the member 112 at 128.

The spring mechanism 110 further includes a second or outer tubular member 130, the tubular member 112 being telescopically received in the tubular member 130. The upper end portion 132 of the tubular member 130 is flattened which end portion 132 is pivotally connected between the clevis and ears 38 on the bight 32 by means of a bolt 134, the bolt 134 passing through the holes 42 in the ears 38, as well as one of the three adjusting holes 100a in the end portion 132, the bolt 134 has a wing nut 136 attached thereto. The tubular member 130 is crimped inwardly to form axially spaced necked portions 138 and 139 for a purpose described immediately below.

A rod 140 has one end 142 threadedly fastened in the hole 124 of the plug 120. The rod 140 slidably extends through an unthreaded hole 142 formed centrally in an annular plug 144 which is held in place by the neck portions 138 and 139. The upper or other end 146 of the rod 140 is threaded so that a retaining nut 148 can be attached thereto. The nut 148 limits the amount of movement of the tubular member 130 in an upwardly inclined direction, as viewed in FIGS. 1–3, that is, to the right, as viewed in FIG. 6.

A coil spring 150 is held captive between the two plugs 120 and 144. In other words, one end of the coil spring 150 presses against the plug 120 and the other end against the plug 144. In this way any movement of the plug 144 is transmitted to the tubular member 130 owing to the plug being captively held by the neck portions 138, 139.

The coil spring 150, it will be appreciated is of appropriate length and strength. The coil spring 150 is initially compressed somewhat but still is capable of being compressed still further as will become clear shortly. What should be understood at this particular point is that the coil spring 150 acts to extend the telescoping members 112, 130 into a more expanded relationship with each other. In effect, there are two longitudinally spaced stops, the ring 126 limiting downward movement of the tubular member 112 and the nut 148 limiting upward movement (to the right in FIG. 6) of the tubular member 130 in that the plug 144 bears against the nut 148. In other words, the two stops 126 and 148 limit the amount of reciprocal movement or stroke that can occur between the overlapping tubular members 112 and 130.

In preparation for performing a raking operation, the user simply grasps the U-shaped handle 44 of the rake 10, more specifically the bight 48, tilting the entire rake 10 so as to cause the tine tips 64 to engage the ground to be transversed, this condition being transitionally shown in FIG. 2 as the rake means 54 is moved from its raised solid line position to its ground-engaging dotted line position. It is then that the user moves the rake 10 forwardly, that is to the left in FIG. 2, causing the tips 64 to pressurally engage the ground. Continued forward movement of the handle 44 will cause the coil spring 150 to become compressed, as can be understood by comparing FIGS. 6 and 7, because the tubular member 130 is forced into a greater degree of overlap with the tubular member 112. Sufficient movement will cause the lower end of the tube 130 to strike the stop 126 (FIG. 6). Stated somewhat differently, the spring mechanism 110 becomes spring loaded by virtue of the compression of the coil spring 150.

Whether the lower end of the outer tubular member 130 engages the stop 126 or not does not affect the operation of the rake 10. If a sufficient amount of manual force is applied to the handle 44, then the tubular member 130 will strike the stop 126 fixedly mounted on the member 112, as can be understood by comparing FIGS. 6 and 7.

The compression of the coil spring 150 may occur gradually as the rake 10 is pushed over the ground to be raked or it can be realized immediately. Also, it should be evident that there may be a full compression of the coil spring 150 or only a partial compression thereof. Whatever compression of the coil spring 150 occurs results in the rake means 54 yielding in accordance with the degree of compression of the coil spring 150. In this way, spring energy is stored which biases the rake means 54 in a direction to more firmly cause the tine tips 64 to engage the ground.

What is important to realize is that, as the ground is being traversed by the rake 10, leaves denoted generally by the reference numeral 160 are being collected by virture of the action supplied by the broom rakes 56. If the user elects to go from one side of the lawn to the other, the leaves 160 are accumulated as he traverses the entire width of the lawn. When he reaches the opposite side and stops, as depicted in FIG. 3, then the spring energy is automatically released which raises the rake means 54 from the solid line ground-engaging position of FIG. 3 to the dotted line position illustrated in this figure and gives the broom rakes 56 a kick that helps in the windrowing of the leaves 160.

Of course, one need not traverse the complete width of a lawn. Instead, the rake 10 is sufficiently lightweight so that the user when grasping the bight 48 and a portion of the bight 32 can perform a quasi sweeping motion, utilizing short strokes in doing so. This type of operation is much like using a manual snow shovel. What occurs is that at the end of each stroke or jab, the spring energy that is stored in the mechanism 110 by virtue of the coil spring being compressed during the raking stroke is released so that the broom rakes 56 kick whatever leaves have been accumulated into an enhanced windrowed condition.

It should be taken into account that whenever the pushing action ceases, the resilient action of the spring mechanism 110, more specifically the spring energy stored by reason of the compression of the coil spring 150, is released so that the broom rakes 56 constituting the illustrated rake means 54 automatically elevate and are somewhat above the ground (once again, see the dotted line position of the rakes 56 in FIG. 3). Thus, when the user wishes to move the rake 10 rearwardly, the elevated condition of the tips 64 provide no interference in that they are not dragged along the ground when the rake 10 is moved backwardly. As already indicated, the raised condition of the tine tips 64 is shown in dotted outline in FIG. 3.

Consequently, one using my rake 10 is afforded a ready capability of collecting leaves, cut grass and other lawn debris that might exist in a variety of manners. As already explained, one can push the rake 10 completely across a lawn, this being more practical when there are but few leaves to be collected. On the other hand, when there are a large number of leaves, the short sweeping strokes will permit the windrow to be progressively built up to whatever degree the user wishes. The various windrows that are formed can then be picked up and removed from the lawn.

My rake 10 lends itself readily to being compactly stored. Attention is therefore directed to FIG. 9 when a fragmentary portion of a building wall 170 is shown, there being several studs 172. Two of the studs 172 have hooks 174 projecting therefrom which underlie the cross bar 14. The bolts 82 are, of course, removed in order that the U-shaped member 28 is free to pivot downward. In other words the first frame 12, by virtue of the bolts 82 (one at each side) being removed from the holes 26b and 36b, can be swung downwardly into a substantially planar relationship with the second frame 66. The spring mechanism 110 can be suitably held upwardly (as depicted), or allowed to depend downwardly (not shown).

I claim:

1. A push rake comprising a first frame unit including a handle member, a second frame unit, wheel means on said second frame unit for traversing the ground to be raked, means connecting said first frame unit to said second frame unit for pivotal movement of said first frame unit about an axis spaced from said wheel means, rake means rigidly mounted on said first frame unit forwardly of said wheel means, and a spring mechanism connected to said first frame unit at a first location spaced rearwardly from said connecting means and to said second frame unit at a second location spaced downwardly from said connecting means and rearwardly from said rake means for yieldingly biasing said frame units relative to each other.

2. A push rake in accordance with claim 1 in which said rake means constitutes at least one broom rake.

3. A push rake in accordance with claim 1 in which said spring mechansim includes a pair of overlapping elongated members constrained for reciprocal movement relative to each other.

4. A push rake in accordance with claim 3 in which one of said members is pivotally connected to said first frame unit at said first location and the other of said elongated members is pivotally connected to said second frame unit at said second location.

5. A push rake in accordance with claim 4 in which said spring mechanism includes a coil spring having one end acted on by said one elongated member and its opposite end acted on by the other of said elongated members.

6. A push rake in accordance with claim 5 in which said coil spring urges said pair of elongated members into an expanded relationship when biasing said frame units.

7. A push rake in accordance with claim 3 including a stop element on one of said elongated members for limiting the movement of the other of said members in one direction.

8. A push rake in accordance with claim 1 in which said second frame unit includes a pair of laterally spaced arm members and a cross member extending transversely therebetween, said cross member providing said second location.

9. A push rake in accordance with claim 8 in which said wheel means includes a pair of wheels rotatively mounted about an axis adjacent one end of said arm members, said cross member extending between said one end of said arm members so that said second location resides generally on said axis, and said means for pivotally connecting said second frame unit to said first frame unit is located adjacent the other end of said arm members.

10. A push rake in accordance with claim 1 in which said second frame unit includes a cross member, one end of said spring mechanism being pivotally connected to the cross member of said second frame unit, said cross member providing said second location.

11. A push rake in accordance with claim 15 in which said first frame unit includes a plurality of peg members projecting from the cross member of said first frame unit, and said second frame unit includes a pair of laterally spaced parallel arm members extending from the cross member of said second frame unit, the ends of said arm members being pivotally connected relative to the cross member of said first frame unit and relative to its peg members in effecting the pivotal connection of said second frame unit to said first frame unit.

12. A push rake in accordance with claim 11 in which said rake means includes at least a pair of broom rakes, said broom rakes having integral hosels and said peg members being received in said hosels.

13. A push rake in accordance with claim 12 in which said second frame unit includes a pair of laterally spaced arm members extending from the cross member of said second frame unit and in which said wheel means includes a pair of wheels, one of said wheels being journaled for rotation adjacent one end of one of said arm members and the other of said wheel members being journaled for rotation adjacent one end of the other of said arm members, the cross member of said second frame unit being spaced from said wheels in a direction toward the other ends of said arm members.

14. A push rake comprising a first frame unit including a first cross bar and handle means extending rearwardly from said first cross bar, a second frame unit including a second cross bar and a pair of laterally spaced arms connected at one end to the ends of said cross bar, a wheel rotatively mounted adjacent one end of each of said arms, means pivotally connecting the ends of the first cross bar to the other ends of said arms, a spring mechanism pivotally connected at one end to said first frame unit at a location spaced from said first cross bar and the other end of said spring mechanism being pivotally connected to the second cross bar of said second frame unit, said spring mechanism angularly biasing said second frame unit relative to said first frame unit, rake means connected to said first cross bar, said rake means including resilient tines and being normally at one angle relative to said second frame unit but being urged into other angles relative to said second frame unit when said first frame unit is pushed, whereby when the free ends of the tines of said rake means engage the ground to be raked when said first frame unit is pushed, said spring mechanism stores energy for subsequent release when the pushing stops.

15. A push rake comprising a first frame unit including a cross member and U-shaped handle member extending therefrom, said U-shaped member having a bight at a location spaced from the cross member of said first frame unit, a second frame unit including a cross member, wheel means on said second frame unit for traversing the ground to be raked, means connecting said first frame unit to said second frame unit for pivotal movement of said first frame unit about an axis spaced from said wheel means, rake means mounted on said first frame unit, and a spring mechanism pivotally connected at one end to said bight and pivotally connected at its other end to the cross member of said second frame unit for yieldingly biasing said frame units relative to each other.

16. A push rake comprising a cross bar, handle means rigidly connected to said cross bar and extending in a rearward direction therefrom for pushing said rake, a pair of laterally spaced arms pivotally connected at their upper ends to said cross bar, a pair of wheels mounted for rotation at the lower ends of said arms, first means mounted transversely to said handle means and spaced rearwardly from said cross bar, second means spaced downwardly from said cross bar and extending transversely between said arms and wheels, a spring mechanism pivotally connected at one end to said first transverse means and pivotally connected at its other end to said second transverse means, and flexible rake means rigidly mounted on said cross bar and forwardly of said wheels wherein said spring mechanism yieldably biases said handle member and said rake means relative to said axes and wheels.

* * * * *